(12) United States Patent
Norstedt et al.

(10) Patent No.: US 9,981,324 B2
(45) Date of Patent: *May 29, 2018

(54) MILLING TOOL

(71) Applicant: SANDVIK INTELLECTUAL PROPERTY AB, Sandviken (SE)

(72) Inventors: Anders Norstedt, Sandviken (SE); Ulrik Sunnvius, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/303,639

(22) PCT Filed: Feb. 18, 2015

(86) PCT No.: PCT/EP2015/053360
§ 371 (c)(1),
(2) Date: Oct. 12, 2016

(87) PCT Pub. No.: WO2015/158447
PCT Pub. Date: Oct. 22, 2015

(65) Prior Publication Data
US 2017/0028484 A1  Feb. 2, 2017

(30) Foreign Application Priority Data

Apr. 16, 2014  (EP) .................................. 14164898

(51) Int. Cl.
*B23C 5/20* (2006.01)
*B23C 5/24* (2006.01)
*B23C 5/22* (2006.01)

(52) U.S. Cl.
CPC .......... *B23C 5/2468* (2013.01); *B23C 5/2208* (2013.01); *B23C 5/2221* (2013.01);
(Continued)

(58) Field of Classification Search
CPC .......... B23B 2200/168; B23B 2205/18; B23C 2200/168; B23C 2210/161;
(Continued)

(56) References Cited

U.S. PATENT DOCUMENTS 4,024,777 A  5/1977 Fogarty
4,541,165 A  9/1985 Sawai et al.
(Continued)

FOREIGN PATENT DOCUMENTS

EP  1013365 A1  6/2000
JP  H04176505 A  6/1992

OTHER PUBLICATIONS

English translation of JP H04-176505, Jun. 1992.*

*Primary Examiner* — Sunil K Singh
*Assistant Examiner* — Alan Snyder
(74) *Attorney, Agent, or Firm* — Corinne R. Gorski

(57) ABSTRACT

A milling tool has a basic body rotatable about a center axis, and including an outside, which includes a pair of opposite front and back sides, as well as a peripheral envelope surface. The body is equipped with a plurality of replaceable cutting inserts. The basic body includes an inner hollow space having an internal limiting surface, in which there collectively mouth a plurality of bores. The bores also mouth in the outside. Each cutting insert is mounted on an outer end of an ejector, which is rectilinearly movable in the individual bore and has an inner end accessible from the hollow space, and which interacts with a compressible force generator, to pull the same into the bore. By mounting the cutting inserts on ejectors, which simultaneously are accessible from a common hollow space, the cutting inserts can be replaced fast and easily, and possibly also be indexed.

8 Claims, 6 Drawing Sheets

Figure 1:
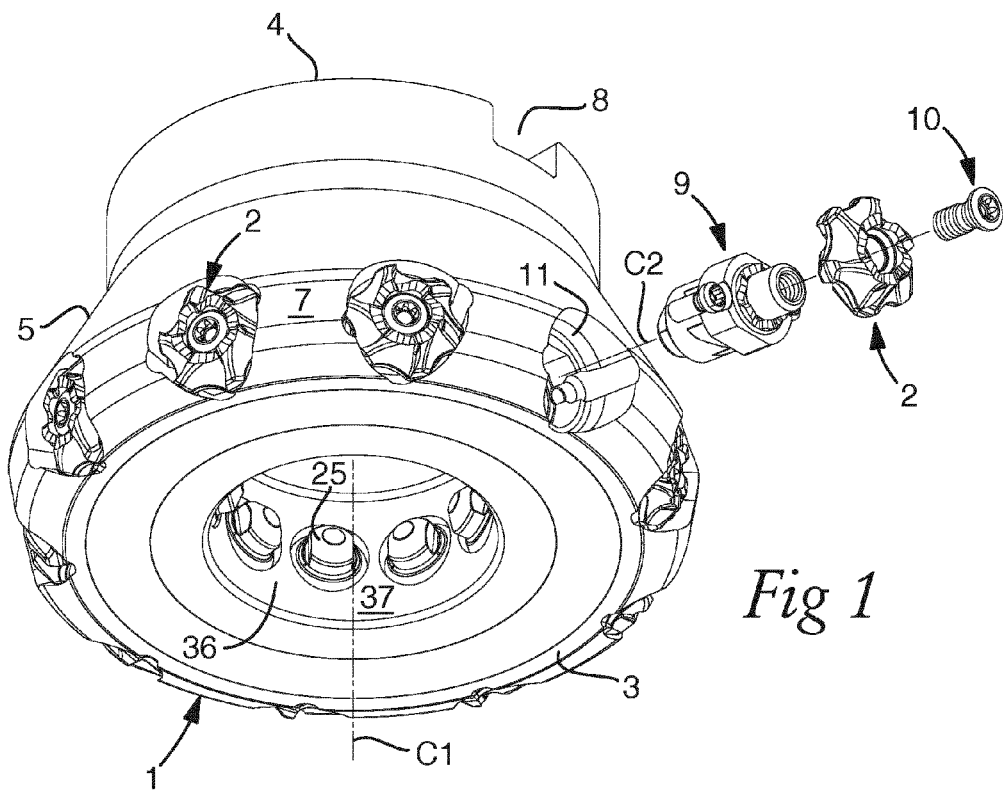

(52) U.S. Cl.
CPC ........ *B23C 5/242* (2013.01); *B23B 2200/168* (2013.01); *B23B 2205/18* (2013.01); *B23C 2200/168* (2013.01); *B23C 2210/161* (2013.01); *B23C 2210/163* (2013.01)

(58) Field of Classification Search
CPC ............ B23C 2210/163; B23C 5/2468; B23C 5/2208; B23C 5/2221; B23C 5/242; B23C 5/08
USPC .......................................................... 483/21
See application file for complete search history.

(56) References Cited

U.S. PATENT DOCUMENTS

| | | | |
|---|---|---|---|
| 4,848,199 A * | 7/1989 | Kelm | ..................... B23B 27/00 407/112 |
| 7,736,099 B2 | 6/2010 | Cole et al. | |
| 9,737,939 B2 * | 8/2017 | Norstedt | ............... B23C 5/2427 |

* cited by examiner

MILLING TOOL

RELATED APPLICATION DATA

This application is a § 371 National Stage Application of PCT International Application No. PCT/EP2015/053360 filed Feb. 18, 2015 claiming priority of EP Application No. 14164898.0, filed Apr. 16, 2014.

TECHNICAL FIELD OF THE INVENTION

This invention relates to a milling tool intended for chip removing machining and of the type that comprises a basic body having a centre axis, on which the same is rotatable, and having an outside, which includes a pair of opposite front and back sides as well as a peripheral envelope surface, and which is equipped with a plurality of replaceable cutting inserts.

Tools of the kind in question are used to machine workpieces of metal or the like material, such as composites.

BACKGROUND OF THE INVENTION AND PRIOR ART

This invention has its origin in problems associated with mounting and dismounting of cutting inserts for milling tools, in particular when these are numerous. Mostly, the cutting inserts for milling tools are indexable by being formed with a plurality of alternately individually usable cutting edges. Particularly usual milling cutting inserts are single-sided and have four alternately usable cutting edges, as well as a central hole, which mouths in a chip face and is intended for a screw by means of which the cutting insert can be fixed in an appurtenant seat in the basic body. In most cases, such cutting inserts are radially mounted, i.e., have their principal planes facing forward in the direction of rotation of the basic body, or, in other words, have their principal planes radially oriented in relation to the milling cutter body.

The work to either replace entirely worn out cutting inserts or to index up fresh cutting edges is time-consuming and at times cumbersome because the fixing screw for each cutting insert has to either be entirely unscrewed to allow removal of the cutting insert from the seat, or at least be untightened somewhat to allow turning of the cutting insert into a new index position in the seat. Not rarely, the cutting inserts are placed in chip channels of limited volume, and thereby difficult to access for a key for the screw. It should here be mentioned that large milling tools, such as face mills having a diameter of 500 mm or more, may include scores of indexable cutting inserts, which have to be loosened one by one upon indexing as well as replacement.

By U.S. Pat. No. 4,541,165, a device intended for milling tools is known, which makes use of mechanical means for on one hand clamping an indexable cutting insert in an operative state, and on the other hand—if required—providing for a contact free indexing of the cutting insert. In the document, a milling cutter is disclosed, the basic body of which on its outside is equipped with a plurality of tangentially spaced-apart cutting inserts, each one of which interacts with a cutting edge replacement device. More precisely, the cutting insert is arranged on a (tangentially) front end of a slide element, the rear end of which is articulately connected with a lever, which protrudes radially from the envelope surface of the basic body to be able to be actuated by an activatable, if required, impact member. In its operative state, the cutting insert is kept in place by means of a mechanical spring, which is kept pressed against the chip face of the cutting insert.

For several reasons, the milling tool and its cutting edge replacement devices disclosed in U.S. Pat. No. 4,541,165 are not very suitable for practical milling. One of these reasons is that said levers protrude radially from the periphery of the basic body. Another is that the spring clamping the cutting insert is open exposed to hammering, hot chips. A particularly aggravating disadvantage is, however, that the cutting inserts only can be indexed or replaced one by one. Even if the screws clamping the cutting inserts do not need to be loosened manually in connection with indexing, the indexing work is still time-consuming because the cutting edge exchange mechanisms for all cutting inserts have to—by stepwise turning up of the basic body—be brought into positions in which the individual levers contact and can be actuated by the impact member. In addition, replacement of worn out cutting inserts will probably be cumbersome and time-consuming because the clamping springs have to be removed before the cutting inserts can be picked away.

SUMMARY

The present invention aims at obviating above-mentioned shortcomings of the milling tool known by U.S. Pat. No. 4,541,165 and at providing an improved milling tool. Thus, a primary object of the invention is to provide a milling tool having a plurality of cutting inserts, which simultaneously can be made easy to access in connection with replacements and thereby reduce the time-consumption for this work. A further object is to provide a milling tool equipped with indexable cutting inserts, the cutting inserts of which can be indexed in a fast, simple and reliable way.

According to the invention, at least the primary object is attained by the basic body being formed with an inner hollow space having an internal limiting surface, in which there collectively mouth a plurality of bores, which also mouth in the outside of the basic body, and by each cutting insert being mounted on an outer end of an ejector, which is rectilinearly movable in the individual bore and has an inner end accessible from the hollow space, and which interacts with a compression spring (or another compressible force generator), which aims at pulling in the same into the bore.

The invention is based on the idea of mounting each one of a plurality of cutting inserts included in a milling tool on one end of a spring-loaded ejector, the inner end of which is accessible and actuatable from an inner hollow space in the basic body of the tool. Thanks to the inner end of the ejector being accessible from the hollow space, a suitable accessory, e.g., a mandrel, may be inserted into the hollow space and subject all ejectors to a force, which overcomes the force in the force generators and executes an ejection of the cutting inserts to a position spaced apart from their seats.

The invention may be applied to several different types of milling tools, one of which is the type of face or end mills that has its cutting inserts located in a ring-shaped transition between a front side and a rotationally symmetrical envelope surface. Another type of milling tools is such milling cutters that are used for gear hobbing, and which are exemplified in U.S. Pat. No. 7,736,099 B2. In the last-mentioned case, the ejectors may be movable in the axial direction, instead of the radial one, from an operative state near the front side of the basic body, to a position projecting from the front side, in which all cutting inserts will be conveniently available. In such an application, the cutting inserts may be single-edged, or formed with two or more cutting edges, which can be consecutively indexed up.

In one embodiment, the cutting inserts of the tool are indexable by including a plurality of alternately individually usable cutting edges, the ejectors being included in cutting edge exchange mechanisms, which include turning means for transforming a rectilinear projection of the individual ejector through the appurtenant bore into a simultaneous turning of the same. By this embodiment, the indexing of the cutting inserts can be carried out at the same time as these are thrust out from the appurtenant seat. One of a plurality of advantages of this solution is that the indexing work becomes practicable in a simple and reliable way, in that all cutting inserts in one and the same centrally controlled operation can be indexed uniformly, i.e., without risk of individual cutting inserts being forgotten.

In one embodiment, the hollow space is centrally situated in the basic body and has a limiting surface of a rotationally symmetrical shape, the bores extending radially between the hollow space and the envelope surface included in the outside of the basic body. In this embodiment, a basic body of a rotationally symmetrical shape may be equipped with a large number of tangentially mounted cutting inserts having alternately usable cutting edges, which are situated adjacent to chip channels, which are formed in the proper cutting inserts contrary to such chip channels that are formed in the basic body and intended for radially mounted cutting inserts.

In the last-mentioned embodiment, the bores may be tilted at an acute fall angle in relation to a reference plane parallel to the front side of the basic body, and have their radially external mouths located in a transition between the envelope surface of the basic body and the front side thereof.

In one embodiment, the force generator is a compression spring, such as, for instance, a helical spring. This is advantageously a simple and reliable component.

In one embodiment, the cutting edge exchange mechanism comprises a fixedly anchorable stop collar, through which the ejector is movable back and forth, and a carrier included in a rear part of the ejector, the force generator being arranged between the carrier and the stop collar. This is a reliable and simple design of a cutting edge exchange mechanism.

In one embodiment, the stop collar as well as the carrier is included in a pair of sleeves, which also include cylinder walls, which are radially separated from the ejector, the force generator being placed between the ejector and the cylinder walls, and the turning means being included in the cylinder walls of the sleeves. In such a way, the turning means requisite for the turning of the ejector are integrated with walls, which are simple to manufacture and which in a reliable way retain the spring in desired position.

In the above-mentioned embodiment, the turning means may consist of two sets of pointed teeth pointing at each other, which are formed in the cylinder walls and each one of which includes an obliquely cut edge surface, which extends between a point and a tooth gap bottom. In such a way, the manufacture of the cutting edge exchange mechanism is facilitated.

In a further embodiment, the stop collar, included in the cutting edge exchange mechanism, includes a seat, intended for the receipt of the cutting insert, in the form of a gear rim having tangentially spaced-apart cogs, which include a shallowly tilted flank surface as well as a steeply tilted flank surface, which together delimit an individual gash, besides which the cutting insert includes a second gear rim having analogous cogs arranged to engage the gashes of the first gear rim. In such a way, an efficient means is obtained in a simple way for completing a turning motion provided by the teeth so that the teeth are brought into a position in which the points of the teeth are located overlapping each other in order to be able to commence a new turning motion.

BRIEF DESCRIPTION OF THE APPENDED DRAWINGS

Figure 2:
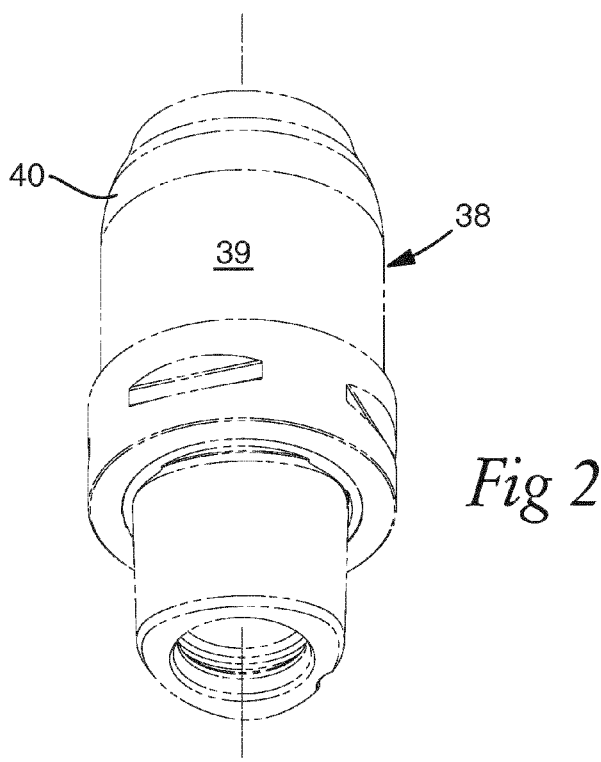
Figure 3:
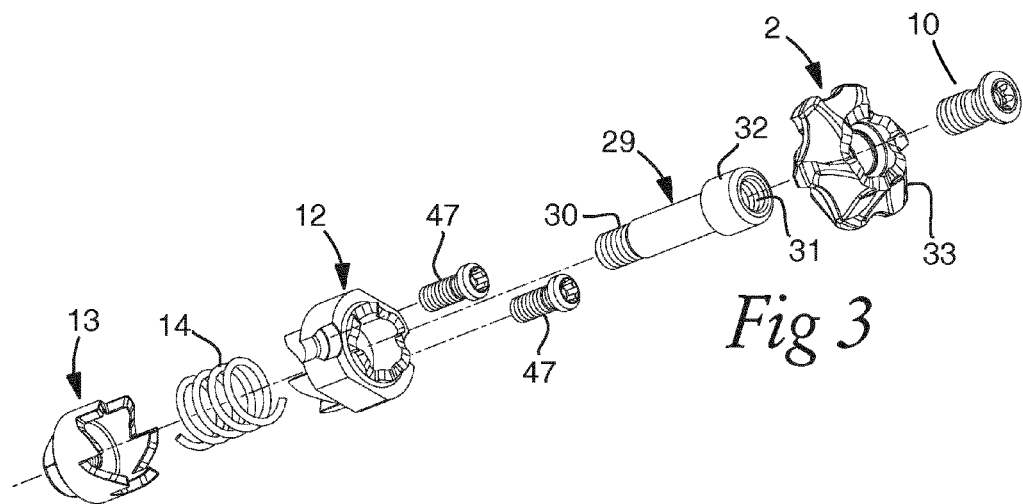
Figure 4:
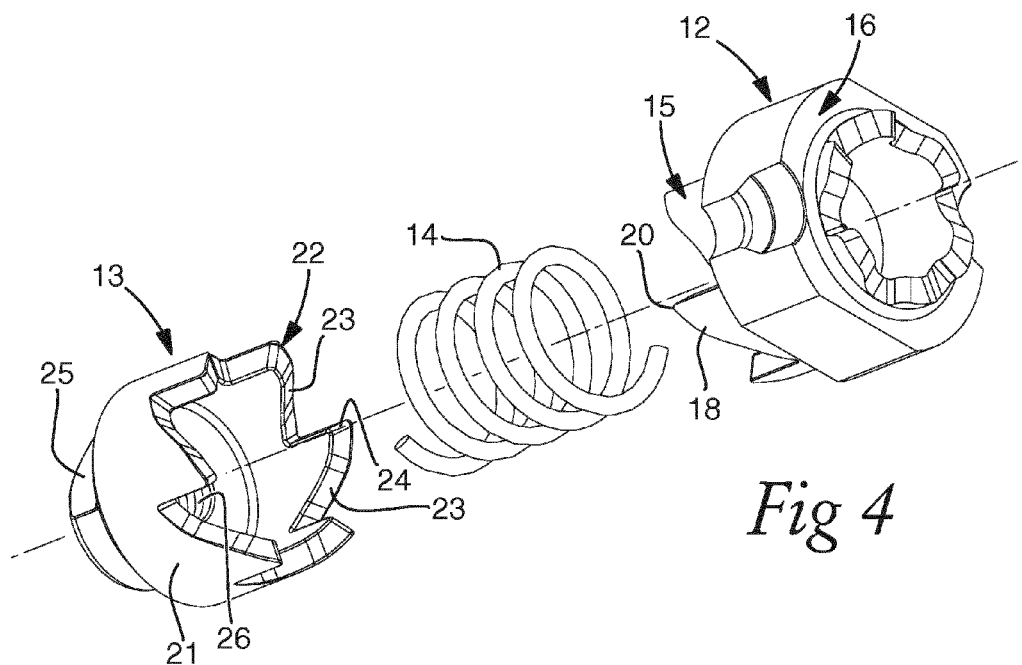
Figure 5:
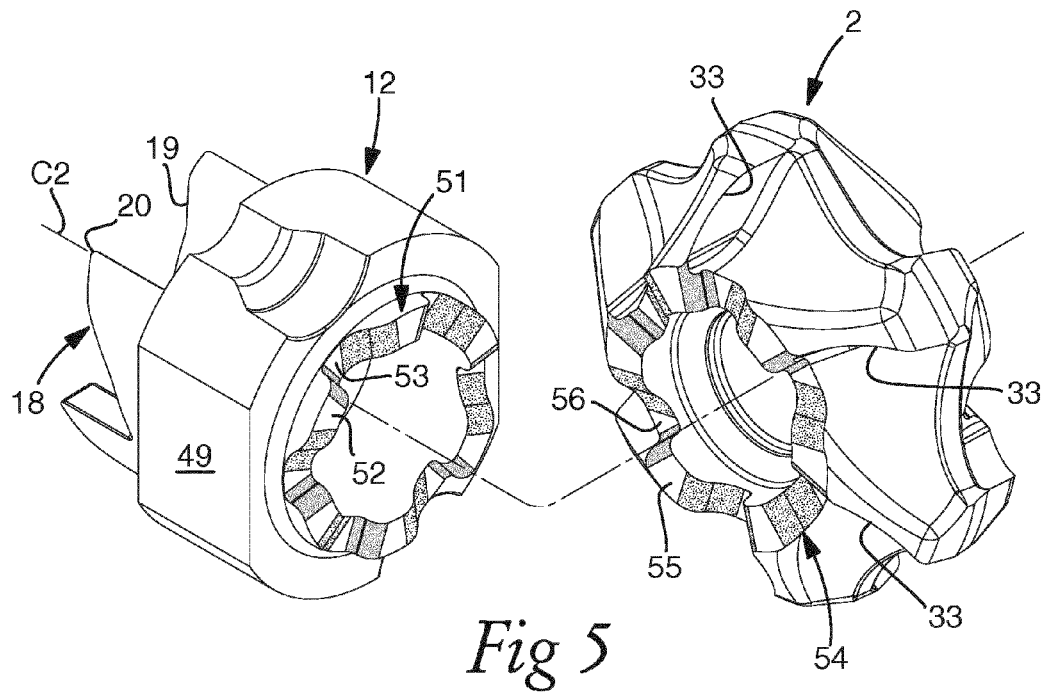
Figure 6:
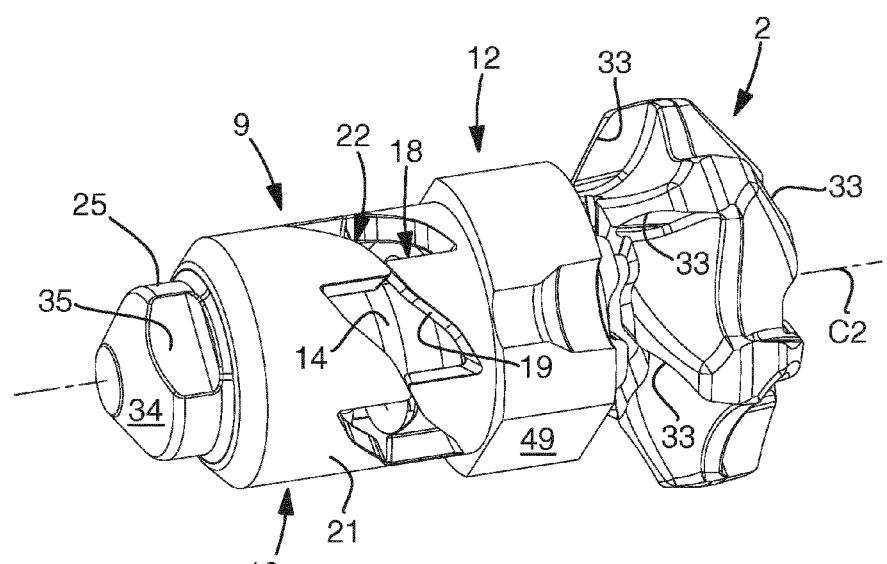
Figure 7:
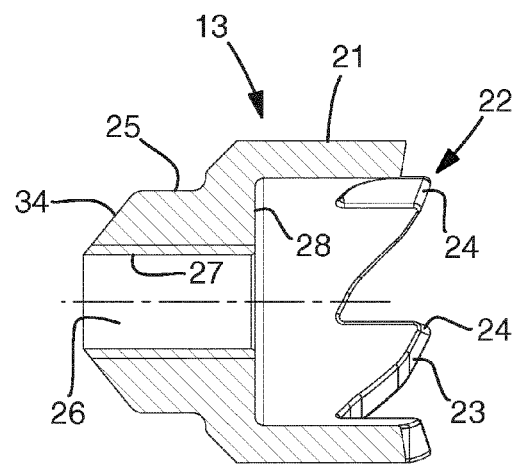
Figure 8:
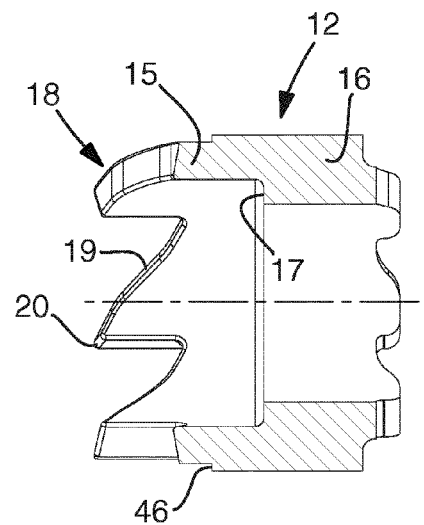
Figure 9:
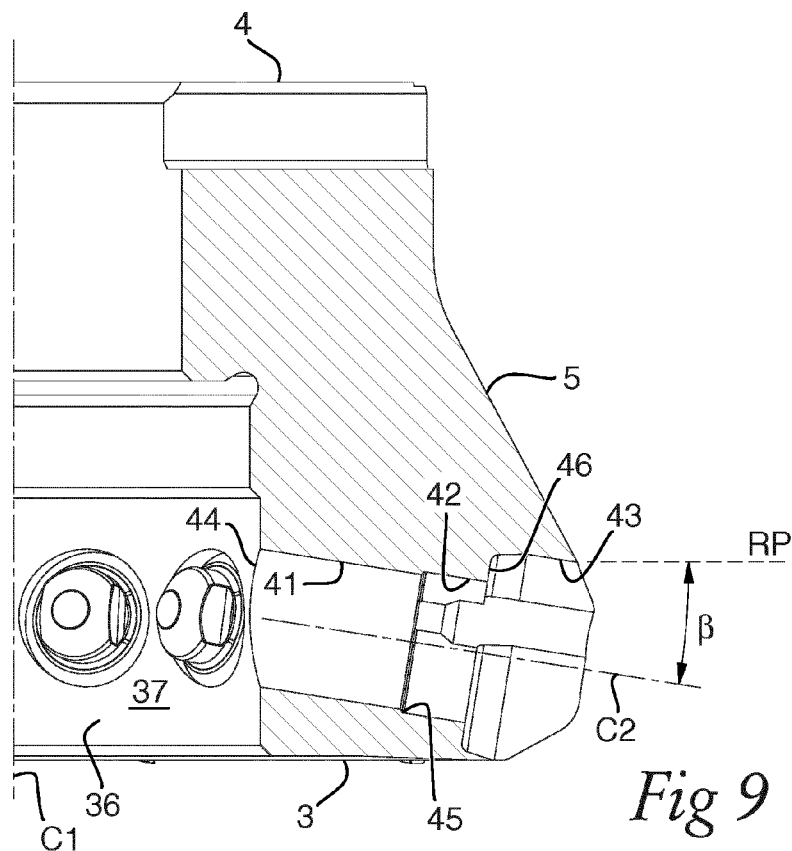
Figure 10:
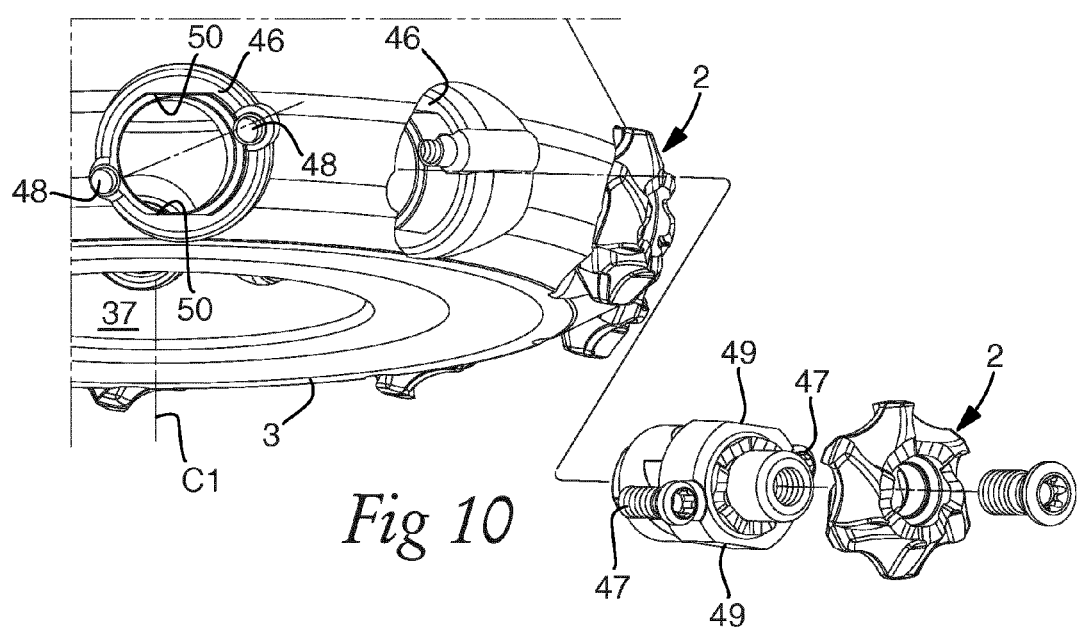
Figure 11:
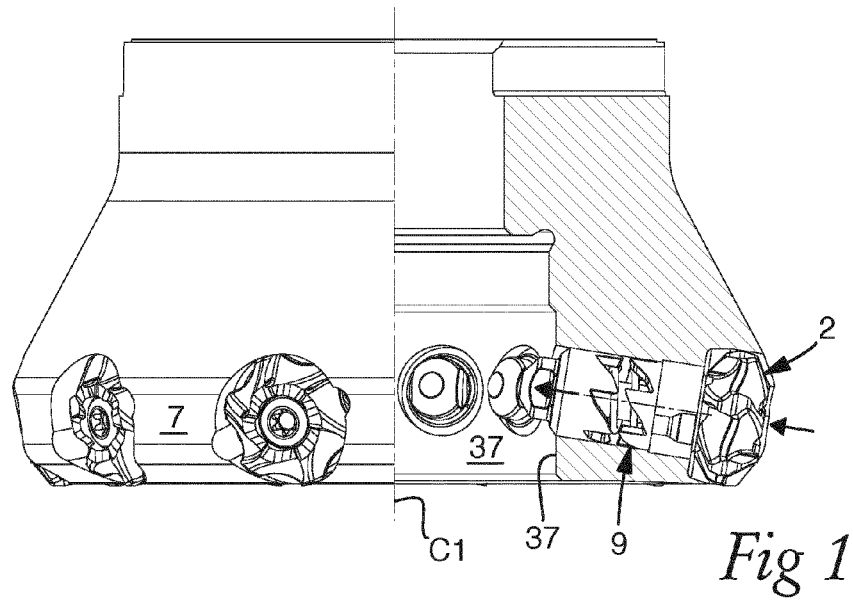
Figure 12:
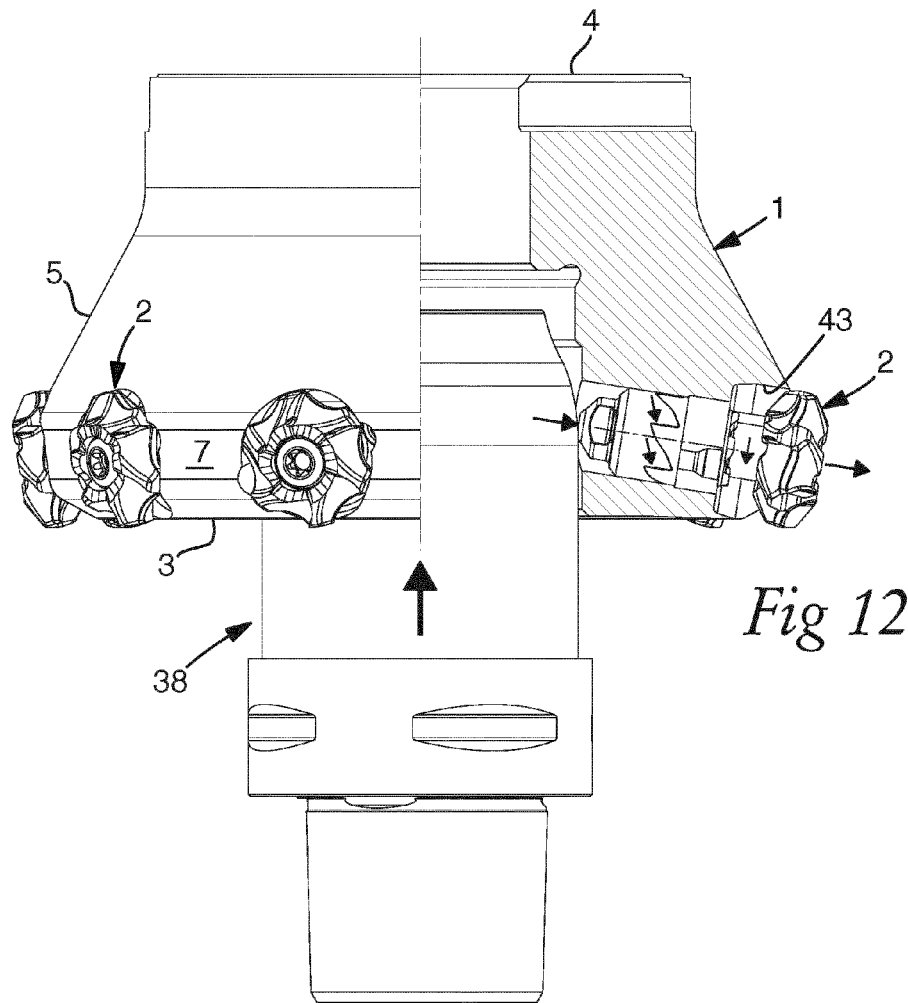

In the drawings:

FIG. 1 is a partly exploded worm's eye view showing a tool according to the invention, FIG. 2 is an accessory shown with dash-dotted lines in the form of a mandrel to execute ejection of the cutting inserts of the tool, FIG. 3 is a perspective exploded view showing a cutting insert as well as a number of components, which are included in a mechanism for simultaneous ejection and indexing of the same, FIG. 4 is an enlarged exploded view showing a pair of sleeves included in said mechanism as well as a compression spring acting between the same, FIG. 5 is a perspective exploded view showing one of the sleeves as well as a cutting insert, FIG. 6 is a perspective view showing the cutting insert as well as the combined ejection and indexing mechanism, FIG. 7 is a longitudinal section through the inner sleeve that is included in the mechanism, FIG. 8 is an analogous longitudinal section through the outer sleeve of the mechanism, FIG. 9 is a partial section through one half of the basic body of the tool, illustrating the design of an (empty) bore for the ejection mechanism, FIG. 10 is a perspective exploded view showing the ejection mechanism and the appurtenant cutting insert separated from the bore, FIG. 11 is a partly sectioned side view of the basic body showing the cutting inserts in their operative states, and FIG. 12 is a side view corresponding to FIG. 11 showing the cutting inserts in an ejected state, as well as the mandrel for the execution of the ejection.

DETAILED DESCRIPTION OF AN EXEMPLIFYING EMBODIMENT OF THE INVENTION

In the drawings, a cutting tool made in accordance with the invention in the form of a face or end mill is illustrated. In the tool, a basic or tool body, in its entirety designated 1, is included, which is equipped with a plurality of replaceable cutting inserts 2. The basic body 1 includes a pair of opposite front and back sides 3, 4 (see FIGS. 1 and 9) as well as an envelope surface 5 positioned between the same and having an endless, rotationally symmetrical shape. In the outside of the basic body, the front side 3, the envelope surface 5, and the back side 4 are included. The last-mentioned one is a flat, ring-shaped surface. Also the front side 3 is a flat, ring-shaped surface, which in the example extends perpendicular to a central axis C1, on which the basic body is rotatable. The surfaces 3 and 4 are mutually parallel and also parallel to a reference plane RP, shown in FIG. 9. It should furthermore be pointed out that the surface of revolution, which forms the envelope surface 5, is generated on the centre axis C1 and has a generatrix, the contour shape of which is best seen in FIG. 9. In a transition between the envelope surface and the front side 4, there is included a peripheral part surface 7 of a slightly conical shape.

In the example, the number of cutting inserts 2 amounts to ten. The pitch between the cutting inserts is uniform and amounts to 36°. It should also be mentioned that a groove 8 is countersunk in the back side 4 of the basic body. Via this groove, the requisite torque can be transferred to the basic body from a driving source.

In FIG. 1, one of the cutting inserts 2 is shown exploded away from the basic or tool body 1 together with an ejection mechanism in its entirety designated 9, as well as a screw 10. The other nine cutting inserts assume positions in which they are operative and in engagement with the appurtenant seats.

In the envelope surface 5 of the basic body 1, a plurality of bores 11 mouth, which have the purpose of housing the ejection mechanisms 9 as well as the cutting inserts 2. Centre axes of said bores are designated C2 and oriented essentially radially in relation to the centre axis C1 of the basic body, more precisely so far that they radiate equiangularly from the last-mentioned one.

In accordance with the invention, a hollow space 36 having an internal limiting surface 37 is formed in the interior of the basic body 1. In the example, the hollow space 36 is in the form of a through hole, which extends between the front side 3 and the back side 4. The shape of the hollow space 36 is generally rotationally symmetrical, the limiting surface 37 being cylindrical.

In FIG. 2, there is shown a tool accessory in the form of a mandrel 38, which, in addition to a cylindrical envelope surface 39, includes a conical surface 40, which tapers toward a front end of the mandrel. The diameter of the mandrel along the envelope surface 39 is only just slightly smaller than the inner diameter of the hollow space 36.

Reference is now made to FIGS. 3-8, which illustrate the structure of the individual ejection mechanism 9. Components of this mechanism comprise a pair of generally cylindrical sleeves, a first one of which is designated 12 and a second one 13. Between these sleeves 12, 13, there acts a compressible force generator 14 in the form of a simple, mechanical compression spring, more precisely a screw compression spring. Of the two sleeves, the sleeve 12 forms a radially outer sleeve in the basic body, while the sleeve 13 forms a radially inner sleeve.

The outer sleeve 12 (see FIGS. 4 and 8) includes a cylinder wall 15 as well as a stop collar 16 having a through hole the inner diameter of which is smaller than the inner diameter of the cylinder wall 15. In such a way, a circumferential shoulder surface 17 is obtained, against which an outer end of the spring 14 can abut. In the cylinder wall 15, there are included a plurality of teeth 18 having tilted edge surfaces 19, which are running toward points 20 of the teeth.

Also the inner sleeve 13 includes a cylinder wall 21 having a set of pointed teeth 22, which include obliquely cut edge surfaces 23, which are running from points 24 of the teeth. In the sleeve 13, there is also included a ring-shaped, rear part 25, i.e., a part having a hole 26, in which a female thread 27 is included. The diameter of the hole 26 is smaller than the inner diameter of the cylinder wall 21. In such a way, a ring-shaped shoulder surface 28 is formed, against which the inner end of the spring 14 can abut.

The rear part 25 of the sleeve 13 is included in an ejector together with a rod 29 (see FIG. 3), which in a rear end includes a male thread 30 and in a front end a female thread 31, which in the example is formed in a head 32.

In the shown embodiment of the milling tool, the cutting inserts 2 are double-sided and formed with six alternately individually usable cutting edges 33 along each one of two opposite sides, which may be turned either outward or inward in relation to the basic body. For this reason, the number of teeth 18, 22 of the sleeves 12, 13 amounts to exactly six.

The outer sleeve 12 is fixedly anchored in relation to the basic body 1, while the inner sleeve 13 and the rod 29 forming an ejector are collectively movable back and forth in the individual bore 11.

With reference to FIG. 6, it should be pointed out that the rear part 25 of the sleeve 13 includes a conical surface 34 as well as two opposite, flat surfaces 35, which form a key grip.

Reference is now made to FIG. 9, which shows how the bore 11 includes three different, cylindrical sections 41, 42, and 43. The inner section 41 mouths in the cylindrical limiting surface 37 of the hollow space 36 via a mouth 44 and has a smallest diameter. An intermediate section 42 has a somewhat greater diameter. In such a way, a ring-shaped shoulder 45 is formed between the sections 41 and 42. The outer section 43 has a considerably greater diameter than the intermediate section 42, and therefore a comparatively wide shoulder surface 46 is formed between the sections 42 and 43. The section 43, which forms the outer mouth of the bore 11, has a sufficiently large radius and a sufficiently large depth to be able to surround and protect the major part of the cutting insert 2, which in the example has a circular basic shape.

Reference is now made to FIG. 10, wherein the outer sleeve 12 is fixedly anchored in relation to the basic body 1 by means of two screws 47, which can be tightened in threaded holes 48 opening in the shoulder surface 46. Rotational securing of the sleeve 12 is made by means of a pair of flat external surfaces 49, which interact with a pair of flat, internal surfaces 50 in the bore 11.

The inner sleeve 13 is fixedly connected with the rod 29 by the male thread 30 of the rod 29 having been screwed in in the female thread 27 of the sleeve.

A cutting insert 2 is attached to the second end of the rod 29 by the fact that a screw 10 extends through a central hole in the cutting insert and is screwed in in the female thread 31 of the rod.

In FIG. 5, it is shown how the outer, fixed sleeve 12 includes a seat 51 for the cutting insert 2. In this case, the seat consists of a rim of male and female members in the form of cogs 52 and gashes 53, respectively. An analogous rim 54 of alternating cogs 55 and gashes 56 is also formed in each one of the two opposite sides of the cutting insert 2.

The Function and Advantages of the Invention

In its operative state, each individual cutting insert 2 is located in the outer section 43 of the bore 11 and is in engagement with the seat 51, more precisely so far that the cogs 55 of the gear rim 54 engage the gashes 53 of the seat. In such a way, the cutting insert is rotationally secured in relation to the basic body. Axially, the cutting insert is secured by the fact that the compression spring 14 rests against the stop collar 16 in the fixed, outer sleeve 12 and presses against the shoulder surface 28 in the movable, inner sleeve 13 so that the inner sleeve is pushed inward in the basic body toward the centre axis C1 of the basic body 1 and in that connection carries the rod 29 and the cutting insert 2 attached to the same so that the cutting insert 2 is kept fixedly pressed in the seat. The rear part 25 of the inner sleeve 13 thereby performs the functions of a carrier 25. In this state, the inner end of the ejector protrudes inward a distance inside the limiting wall 37 of the hollow space 36, as shown in FIG. 11. In this connection, the teeth 18, 22 are radially separated from each other, and having their points turned to overlapping positions.

When the cutting insert either should be indexed or replaced, the mandrel 38 is brought into the hollow space 36 in the basic body 1. In this connection, the conical surface 40 of the mandrel will successively press out all ejectors 29 radially outward through the bores 11 while overcoming the spring force of the springs 14. When the mandrel reaches an inner end position in the hollow space 36, the individual cutting insert 2 has been pushed outward to a radially outer end position, in which the same has left the outer, wide section 43 of the bore (see FIG. 12).

If the cutting inserts 2 only are to be indexed, this operation is executed during the projection of the ejector thanks to the co-operation of the teeth 18, 22 with each other. More precisely, the obliquely cut edge surfaces 19, 23 of the teeth will be urged and slide against each other to compulsorily turn the movable sleeve 13 in relation to the fixed one 12, thereby transforming the axial movement of the ejector into a simultaneous turning motion. By forming the sleeves 12, 13 with as large a number of teeth as the number of cutting edges 33 of the cutting insert, the cutting insert will be step-wise turnable a number of steps corresponding to the number of cutting edges. Thus, in the example, the cutting insert can be indexed in six steps, the turning angle in each step amounting to 60°.

In this connection, it should be pointed out that the proper teeth 18, 22 only can turn the sleeve 13 approx. 55°, while the remaining turning of 5° to complete a 60° turning is provided for by means of a shallowly tilted flank surface on each one of the cogs 52 and 56. By this concluding turning of the cutting insert into a new indexed-up end position, the points of the teeth will once again overlap each other so that the next indexing operation could be initiated.

If the cutting inserts, after all cutting edges having been consumed, should be replaced, the same are allowed to remain in the ejected position shown in FIG. 12. In this position, the fixing screw is unscrewed from the threaded hole 31, whereupon the cutting insert can be picked out in a state wherein its periphery is conveniently accessible to the fingers of the hand (or a picking robot).

A primary advantage of the invention is that all cutting inserts of the tool can simultaneously be ejected to positions in which they are spaced apart from the appurtenant seats in the basic body. In such a way, the same can be released and picked away in a simple and convenient way for the operator. When the ejection mechanism is combined with means for turning the cutting insert from one index position to another in connection with ejection, the advantage is in addition gained that all cutting inserts can be indexed by a single central manoeuvre. A particular advantage in doing so is that the cutting inserts for certain are indexed in unison, i.e., without individual cutting inserts being forgotten or misindexed.

Feasible Modifications of the Invention

The invention is not solely limited to the embodiment described above and shown in the drawings. Thus, the cutting inserts neither need to be tangentially mounted nor indexable. As previously mentioned, the cutting inserts could be single-edged or have only a few cutting edges, and be mounted on ejectors, which are axially movable toward and from a front side of the tool body instead of being radially movable toward and from an envelope surface. Such an application of the invention is feasible in, for instance, the type of hob cutters that is disclosed in U.S. Pat. No. 7,736,099 B2.

The invention claimed is:

1. A milling tool for chip removing machining, comprising:
a basic body rotatable about a centre axis and having an outside, which includes a pair of opposite front and back sides and a peripheral envelope surface; and
a plurality of replaceable cutting inserts, wherein the basic body includes an inner hollow space being centrally situated in the basic body and having an internal limiting surface of a rotationally symmetrical shape, in which there collectively mouth a plurality of bores, which extend radially between the inner hollow space and the peripheral envelope surface, wherein the bores also mouth in the peripheral envelope surface, each cutting insert being mounted on an outer end of an ejector, which is rectilinearly movable in a respective bore and having an inner end accessible from the inner hollow space, and which interacts with a compressible force generator, arranged to pull the ejector into the bore.

2. The milling tool according to claim 1, wherein the cutting inserts are indexable by including a plurality of alternately individually usable cutting edges, the ejector being included in a cutting edge exchange mechanism, which includes turning means for transforming a rectilinear projection of the ejector through the bore into a simultaneous turning of the same.

3. The milling tool according to claim 2, wherein the cutting edge exchange mechanism further includes a fixedly anchorable stop collar, through which the ejector is movable back and forth, and a carrier included in a rear part of the ejector, the force generator being arranged between the carrier and the stop collar.

4. The milling tool according to claim 3, wherein the stop collar, as well as the carrier is included in a pair of sleeves, which also include cylinder walls, which are radially separated from the ejector, the force generator being placed between the ejector and the cylinder walls and the turning means being included in the cylinder walls of the sleeves.

5. The milling tool according to claim 4, wherein the turning means consist of two sets of pointed teeth pointing at each other and arranged in the cylinder wall of each sleeve, each tooth including an obliquely cut edge surface, which extends between a point and a tooth gap bottom.

6. The milling tool according to claim 5, wherein the stop collar includes a seat intended for receipt of the cutting insert and being in the form of a gear rim having tangentially spaced-apart cogs, each cog including a shallowly tilted flank surface, as well as a steeply tilted flank surface, which together delimit an individual gash.

7. The milling tool according to claim 1, wherein the force generator is a mechanical compression spring.

8. The milling tool according to claim 1, wherein the bores are tilted at an acute fall angle in relation to a reference plane parallel to the front side of the basic body, and having radially external mouths located in a transition between the envelope surface of the basic body and the front side thereof.

* * * * *